United States Patent
Yoshizawa et al.

(10) Patent No.: US 7,376,868 B2
(45) Date of Patent: May 20, 2008

(54) CACHE MEMORY DEVICE AND REFERENCE HISTORY BIT ERROR DETECTION METHOD

(75) Inventors: Shuichi Yoshizawa, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 10/347,369

(22) Filed: Jan. 21, 2003

(65) Prior Publication Data

US 2004/0078702 A1   Apr. 22, 2004

(30) Foreign Application Priority Data

Jun. 28, 2002   (JP)   ............. 2002-191018

(51) Int. Cl.
  *G06F 11/00* (2006.01)
(52) U.S. Cl. ............................. 714/42
(58) Field of Classification Search ............ 714/42; 711/136
  See application file for complete search history.

(56) References Cited

U.S. PATENT DOCUMENTS

| | | | | |
|---|---|---|---|---|
| 4,168,541 A | * | 9/1979 | DeKarske | 365/49 |
| 4,530,055 A | * | 7/1985 | Hamstra et al. | 711/136 |
| 4,607,331 A | * | 8/1986 | Goodrich et al. | 711/136 |
| 4,783,735 A | * | 11/1988 | Miu et al. | 711/136 |
| 4,811,203 A | * | 3/1989 | Hamstra | 711/142 |
| 4,967,414 A | * | 10/1990 | Lusch et al. | 714/45 |
| 5,125,085 A | * | 6/1992 | Phillips | 711/122 |
| 5,140,690 A | * | 8/1992 | Hata et al. | 714/5 |
| 5,222,224 A | * | 6/1993 | Flynn et al. | 711/144 |
| 5,325,504 A | * | 6/1994 | Tipley et al. | 711/128 |
| 5,325,511 A | * | 6/1994 | Collins et al. | 711/128 |
| 5,666,482 A | * | 9/1997 | McClure | 714/8 |
| 5,845,320 A | * | 12/1998 | Pawlowski | 711/136 |

FOREIGN PATENT DOCUMENTS

| | | |
|---|---|---|
| JP | 52-014321 | 2/1977 |
| JP | 58-050694 | 3/1983 |
| JP | 60-142759 | 7/1985 |
| JP | 63-195753 | 8/1988 |
| JP | 10-003427 | 1/1998 |

OTHER PUBLICATIONS

Japanese Office Action mailed Jan. 23, 2007 for Corresponding Japanese Patent Application No. 2002-191018.

* cited by examiner

*Primary Examiner*—Robert Beausoliel
*Assistant Examiner*—Amine Riad
(74) *Attorney, Agent, or Firm*—Staas & Halsey LLP

(57) ABSTRACT

A cache memory device in an N-way (N is an integer of 2 or larger) set associative system includes a way detection unit detecting one way exhibiting a specified strength on the basis of a reference history defined as bits representing a win/loss relation between ways and updated so as to indicate one way exhibiting the specified strength, and an error detection unit detecting a bit error in the reference history if the way detection unit does not detect one way exhibiting the specified strength.

11 Claims, 8 Drawing Sheets

FIG. 2

|      | WAY0  | WAY1  | WAY2  | WAY3 |
|------|-------|-------|-------|------|
| WAY0 | —     | #5    | #4    | #3   |
| WAY1 | [#5]  | —     | #2    | #1   |
| WAY2 | [#4]  | [#2]  | —     | #0   |
| WAY3 | [#3]  | [#1]  | [#0]  | —    |

FIG. 4

|      | WAY0 | WAY1 | WAY2 | WAY3 |
|------|------|------|------|------|
| WAY0 | —    | 1    | 1    | 1    |
| WAY1 | 0    | —    | 1    | 1    |
| WAY2 | 0    | 0    | —    | 1    |
| WAY3 | 0    | 0    | 0    | —    |

FIG. 5

|  | WAY0 | WAY1 | WAY2 | WAY3 |
|---|---|---|---|---|
| WAY0 | — | 1 | 1 | 1 |
| WAY1 | 0 | — | 1 | 1 |
| WAY2 | 0 | 0 | — | 0 |
| WAY3 | 0 | 0 | 1 | — |

FIG. 6

|  | WAY0 | WAY1 | WAY2 | WAY3 |
|---|---|---|---|---|
| WAY0 | — | 1 | 1 | 0 |
| WAY1 | 0 | — | 1 | 1 |
| WAY2 | 0 | 0 | — | 1 |
| WAY3 | 1 | 0 | 0 | — |

CACHE MEMORY DEVICE AND REFERENCE HISTORY BIT ERROR DETECTION METHOD

BACKGROUND OF THE INVENTION

The present invention relates generally to a cache memory device in an N-way set associative system, and more particularly to a cache memory device capable of detecting a bit error in a reference history without using redundant bits such as parity bits and to a reference history bit error detection method.

In the cache memory device in the N-way set associative system, it has hitherto been known that way information, as shown based on an LRU (Least Recent Used) algorithm, exhibiting the earliest time of being referred to (or updated) for the last time within the same set, is written back to a main storage device (main memory), and this scheme is advantageous in terms of performance.

An operation of the conventional cache memory device will be explained with reference to the drawings. FIG. 8 is an explanatory flowchart showing the operation of the conventional cache memory device.

When an access request to a specified address in an address space of the main memory (S200), to begin with, this address is separated into a match address and a line address. A tag RAM of each way is searched according to the line address, and an entry address read from the tag RAM is compared with the match address (S201). If the entry address is coincident with the match address, this implies that the way concerned is hit (S202: Yes). In this case, the hit way is sent back, and there is effected an access to a copy of the main memory that is retained on a data RAM of the way concerned (S203).

Whereas if the match address hits none of the entry addresses of the ways (S202: No), information of a certain way is written back (or invalidated) and thrown away from the entry of the tag RAM, and the copy of the main memory having an address corresponding to the access request is read into a cache. A reference history is read for selecting this throw-out way (replace target way) (S204) Next, it is judged whether a 1-bit error in the reference history is detected (S205). This error detection is executed based on redundant bits attached to the readout reference history (which may be called, e.g., a parity check). Then, if the parity check occurs (S205: Yes), it is considered that this reference history contains an error, and an error report is made (S206). Then, a way having the lowest number among the valid ways is sent back (S207). Further, in the case of making a win/loss decision based on the reference history, if there occurs a contradictory in a reference time relation, the same process as when the parity error occurs has hitherto been executed in order to prevent zero-select or double-select of the way.

The write-back to the main memory involves retaining, in a tag memory (or a memory area that can be referred to by the set equal thereto), the reference history (which may also be called LRU bits) capable of making a comparison between earliness and lateness of the reference time within the same set. Further, according to a device requested to have a reliability, the redundant bits such as the parity bits, ECC (Error Correcting Code) and so on are added to the reference history.

If the system increases in scale with an extended address space, a must-be-cached address space likewise increases. If a block size of the cache is the same, each time the cacheable address space is doubled, it follows that a data size of the entry address in the tag memory increases by 1 bit. At this time, there might be a case where the redundant bits for detecting the error in the reference history can not be sufficiently ensured due to a restraint of the data size in the tag memory and so on.

It is an object of the present invention to detect the bit error in the reference history without adding the redundant bits to the reference history in the cache memory device in the N-way set associative system.

SUMMARY OF THE INVENTION

To accomplish the above object, according to one aspect of the present invention, a cache memory device in an N-way (N is an integer of 2 or larger) set associative system, includes a way detection unit detecting one way exhibiting a specified strength on the basis of a reference history defined as bits representing a win/loss relation between ways and updated so as to indicate one way exhibiting the specified strength, and an error detection unit detecting a bit error in the reference history if the way detection unit does not detect one way exhibiting the specified strength.

According to the present invention, the bit error is detected based on the reference history updated so as to indicate one way exhibiting the specified strength. Accordingly, in the cache memory device in the N-way set associative system, the bit error in the reference history can be detected without adding the redundant bits to the reference history.

In the cache memory device in the N-way set associative system, for instance, the reference history may be updated so as to indicate a way referred to or updated latest as one way exhibiting the specified strength.

In the cache memory device in then N-way set associative system, for example, the way exhibiting the specified strength may be the strongest way among N-pieces of ways. Further, the way exhibiting the specified strength may be the weakest way among N-pieces of ways.

The cache memory device in the N-way set associative system may further include a way selection unit selecting a replace target way on the basis of the reference history.

In the cache memory device in the N-way set associative system, for example, the way selection unit may select the weakest way as a replace target way among N-pieces of ways.

In the cache memory device in the N-way set associative system, for instance, the error detection unit may detect a bit error in the reference history after the way selection unit has selected the replace target way.

In the cache memory device in the N-way set associative system, the way selection unit may, if an access request to a specified address hits none of the ways, select a replace target way.

The cache memory device in the N-way set associative system may further include an error report unit reporting an error if, for example, the error detection unit detects a bit error in the reference history. The error is, it can be considered, reported to, e.g., a specified application, unit and so on.

According to another aspect of the present invention, a reference history bit error detection method in a cache memory device in an N-way (N is an integer of 2 or larger) set associative system, includes detecting one way exhibiting a specified strength on the basis of a reference history defined as bits representing a win/loss relation between ways and updated so as to indicate one way exhibiting the specified strength, and detecting a bit error in the reference history if one way exhibiting the specified strength is not detected.

BRIEF DESCRIPTION OF THE DRAWINGS

FIG. 2 is an explanatory diagram showing a structure (meaning) of a reference history in the cache memory device in the 4-way set associative system in the embodiment of the present invention;

FIG. 4 is a diagram showing an example of the reference history in the cache memory device in the 4-way set associative system in the embodiment of the present invention;

FIG. 5 is a diagram showing an example of the reference history in the cache memory device in the 4-way set associative system in the embodiment of the present invention;

FIG. 6 is a diagram showing an example of the reference history in the cache memory device in the 4-way set associative system in the embodiment of the present invention;

DETAILED DESCRIPTION OF THE PREFERRED EMBODIMENTS

A cache memory device in an N-way set associative system will be described by way of an embodiment of the present invention with reference to the accompanying drawings. "N" is an integer of 2 or larger such as 2, 4, 8, 16, 32 and so forth. This embodiment will exemplify a cache memory device in an N-way set associative system (where N=4).

Figure 1:
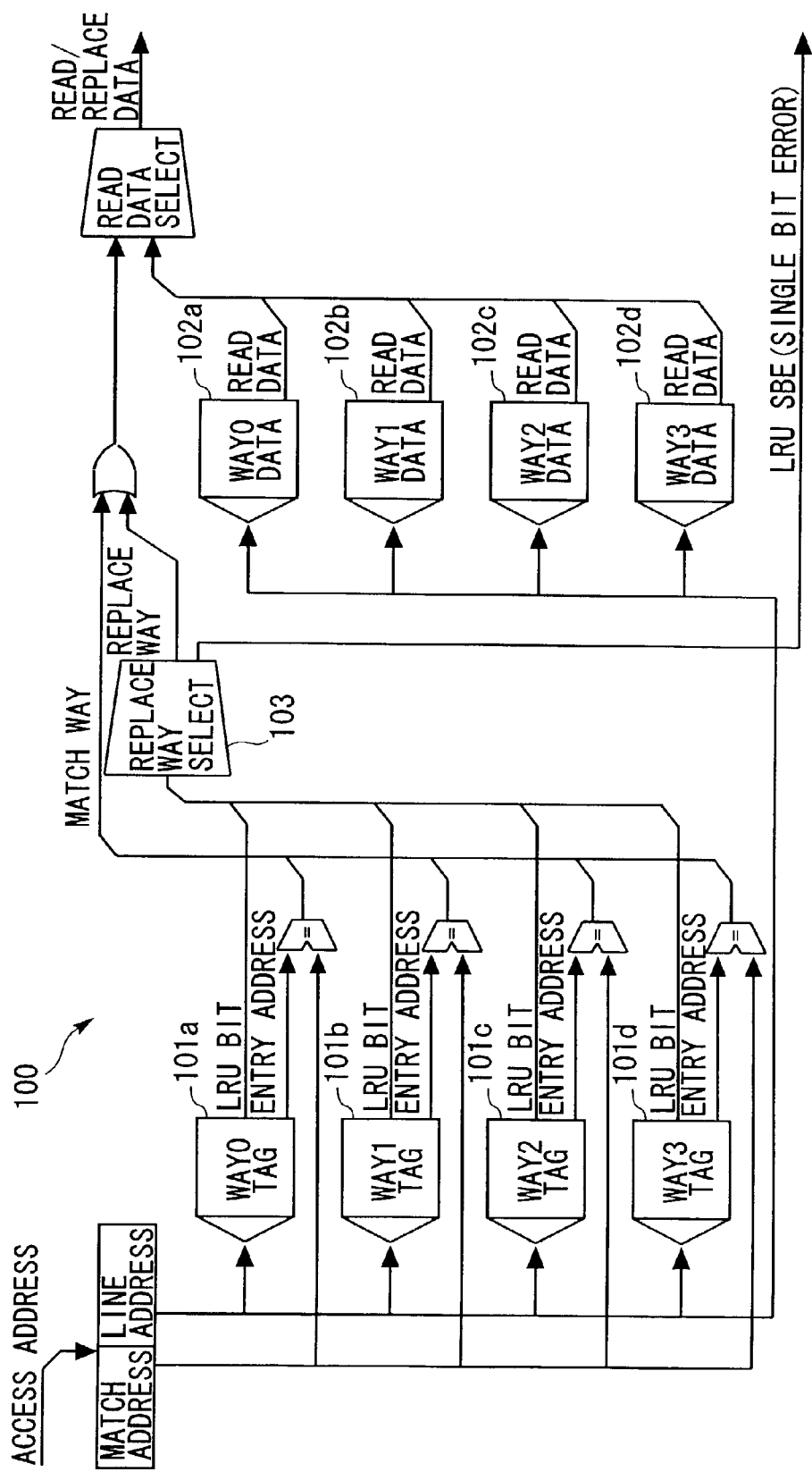
FIG. 1 is an explanatory diagram showing an outline of architecture of a cache memory device in a 4-way set associative system by way of an embodiment of the present invention.

FIG. 1 is an explanatory diagram showing an outline of architecture of the cache memory device in the 4-way set associative system. A cache memory device 100 includes ways (data RAMs) 101a through 101d ways (data RAMs) 102 through 102d to which contents of the main memory are copied, a replace way selection unit 103 etc.

The way 101a is stored with a reference history The reference history has totally 6 bits (4C2=6) of bits 0 through 5 (which will hereinafter be referred to as #0 through #5) indicating a win/loss relation between the ways (that may also be defined as an earliness/lateness relation of the reference or update time). The reference history is updated so as to one way exhibiting a specified strength. For example, the reference history is updated to indicate that the way referred to or updated latest is one way exhibiting the specified strength. The reference history is stored for every set in the way 101a.

FIG. 2 is an explanatory chart showing a structure (meaning) of the reference history. The symbol #5 represents a win/loss relation between the way0 and the way1. For instance, if #5=1, this implies that the way1 wins against the way0 (i.e., the way1 is later in the reference time than the way0). If [#5]=1 in a contrary relation with #5, this implies that the way0 wins against way1.

The symbol #4 represents a win/loss relation between the way0 and the way2. For instance, if #4=1, this implies that the way2 wins against the way0 (i.e., the way2 is later in the reference time than the way0). If [#4]=1 in the contrary relation with #4, this implies that the way0 wins against way2.

The symbol #3 represents a win/loss relation between the way0 and the way3. For instance, if #3=1, this implies that the way3 wins against the way0 (i.e., the way3 is later in the reference time than the way0). If [#3]=1 in the contrary relation with #4, this implies that the way0 wins against way3.

The symbol #2 represents a win/loss relation between the way1 and the way2. For instance, if #2=1, this implies that the way2 wins against the way1 (i.e., the way2 is later in the reference time than the way1). If [#2]=1 in the contrary relation with #2, this implies that the way1 wins against way2.

The symbol #1 represents a win/loss relation between the way1 and the way3 . For instance, if #1=1, this implies that the way3 wins against the way1 (i.e., the way3 is later in the reference time than the way1). If [#1]=1 in the contrary relation with #1, this implies that the way1 wins against way3.

The symbol #0 represents a win/loss relation between the way2 and the way3. For instance, if #0=[1], this implies that the way3 wins against the way2 (i.e., the way3 is later in the reference time than the way2). If [#0]=[1] in the contrary relation with #0, this implies that the way2 wins against way3.

Figure 3:
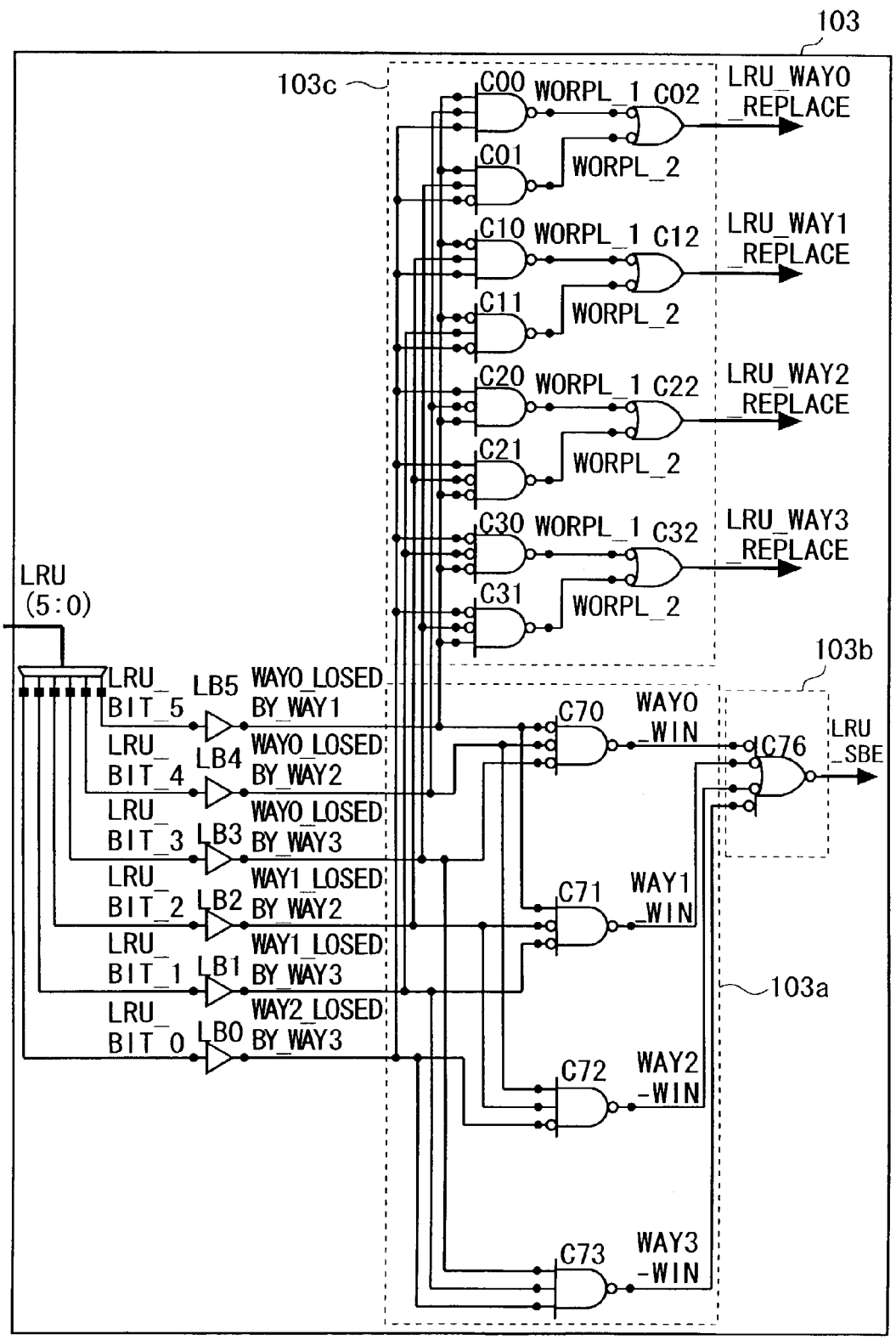
FIG. 3 is an explanatory diagram showing an outline of configuration of a replace way selection unit 103 in the cache memory device in the 4-way set associative system in the embodiment of the present invention.

FIG. 3 is an explanatory diagram showing an outline of configuration of the replace way selection unit 103. The replace way selection unit 103 includes mainly a way detection module 103a, an error detection module 103b and a way selection module 103c.

The way detection module 103a is a logic circuit for detecting the strongest way among the four ways on the basis of the reference history. The way detection module 103a includes NAND operation circuits C70 through C73 for detecting whether each of the ways is stronger than other three ways (namely, whether the way concerned is strongest among the four ways).

The NAND operation circuit C70 detects whether the way0 is stronger than other three ways. If the way0 is stronger than other three ways (i.e., the way0 is strongest among the four ways), the NAND operation circuit C70 outputs WAY0_WIN="0". By contrast, if the way0 is lost to any one of other three ways (i.e., there exists the way stronger than the way0), the NAND operation circuit C70 outputs WAY0_WIN="1". Similarly, the NAND operation circuit C71 detects whether the way1 is stronger than other three ways. The NAND operation circuit C72 detects whether the way2 is stronger than other three ways. The NAND operation circuit C73 detects whether the way3 is stronger than other three ways.

The reference history is updates so as to indicate that the way referred to (or updated) latest is the way having the specified strength. According to this embodiment, the reference history is to be updated so as to indicate that the way referred to or updated latest is the strongest way among the four ways. Namely, when the way is referred to (or updated), the reference history is updated to indicate that the way referred to is the strongest way among the four ways. Therefore, the way detection module 103a normally detects the strongest way among the four ways.

For instance, as shown in FIG. 4, if the reference history is "111111", this indicates that the way 3 showing three pieces of "1" vertically arranged there is strongest (wins against all other ways). When this reference history "111111" is inputted to the way detection module 103a, as obvious from FIG. 3, the NAND operation circuit C73 outputs WAY3_WIN="0", and each of other NAND operation circuits C70 through C72 outputs "1". This indicates that the way detection module 103a detects the way3 as the strongest one among the four ways.

Herein, it is assumed that the way2 is referred to (or updated). In this case, the reference history is updated to indicate that the way2 referred to (or updated) latest is the strongest way among the four ways. FIG. 5 shows that the reference history is updated so as to indicates the way2 being the strongest way. This reference history is what [#0] is updated to 1 and #0 having a contrary relation with [#0] is updated to 0 respectively in the reference history shown in FIG. 4. When this reference history "011111" after being updated is inputted to the way detection module 103a, as apparent from FIG. 3, the NAND operation circuit C72 outputs WAY2_WIN="0", and each of other NAND operation circuits C70, C71 and C73 outputs "1". This indicates that the way detection module 103a detects the way2 as the strongest way among the four ways.

Thus, the reference history is updated to indicate that the way referred to (or updated) latest is the strongest way among the four ways. Therefore, the way detection module 103a normally detects the strongest way among the four ways.

On the other hand, FIG. 6 illustrates a reference history pattern that does not occur in the case of being updated on the rule described above. This reference history "111011" shows that the way2 and the way3 exhibiting two pieces of "1" vertically arranged are stronger, however, the strongest way does not exist.

When this reference history "111011" is inputted to the way detection module 103a, as obvious from FIG. 3, the NAND operation circuits C70 through C73 respectively output "1". There is no output of "0". This implies that the way detection module 103a is unable to detect the strongest way among the four ways.

The error detection module 103b is the logic circuit for detecting, if the way detection module 103 is unable to detect the strongest way among the four ways, a bit error in the reference history.

As illustrated in FIG. 3, the error detection module 103b includes a NOR operation circuit for detecting the bit error in the reference history on the basis of the outputs from (the respective NAND operation circuits C70 through C73 of) the way detection module 103a. for example, when the reference history "111111" shown in FIG. 4 is inputted to the way detection module 103a, as obvious from FIG. 3, the NAND operation circuit C73 outputs "0", and other NAND operation circuits C70 through C72 respectively output "1". Then, the bit error detection module 103b outputs LRU_SBE=0. LRU_SBE=0 indicates that the bit error detection module 103b does not detect any bit error in the reference history. Similarly, when the reference history "011111" shown in FIG. 5 is inputted to the way detection module 103a, the bit error detection module 103b outputs LRU_SBE=0.

On the other hand, when the reference history "111011" that does not occur in the case of being updated on the rule described above is inputted to the way detection module 103a, as apparent from FIG. 3, the NAND operation circuits C70 through C73 respectively output "1", and the bit error detection module 103b outputs LRU SBE="1". LRU_SBE="1" indicates that the error detection module 103b detects the bit error in the reference history.

The way selection module 103c is a logic circuit for selecting a replace target way (that is weakest among the N-ways) on the basis of the reference history. For instance, there are made win/loss decisions between the way0 and the way1 and between the way2 and the way3, thereby determining, as a replace target way, the weakest way from the comparison between the lost ways. As shown in FIG. 3, the way selection module 102c includes NAND operation circuits C00 through C31 and OR operation circuits C02 through C32. For example, the NAND operation circuit C00, when the way0 is lost to (older than) the way1 and the way2 is lost to (older than) the way3, and if the way0 is lost to (older than) the way2, indicates that the weakest (oldest) way0 is set as a replace target. Herein, the emphasis is not put on relations other than the relation described above, and hence one way is invariably selected whatever state the reference history may be in.

Figure 7:
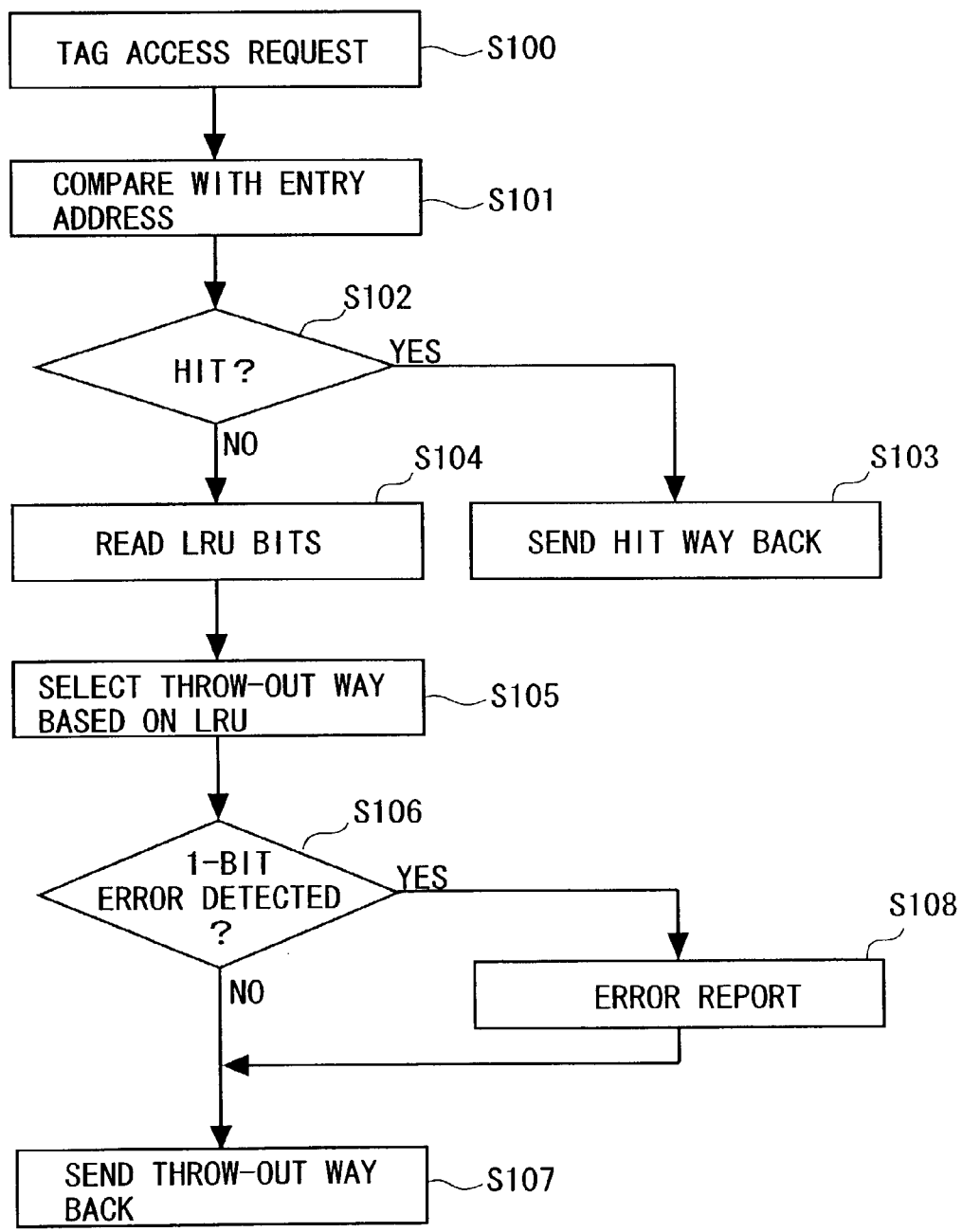
FIG. 7 is an explanatory flowchart showing an operation of the cache memory device in the 4-way set associative system in the embodiment of the present invention.
Figure 8:
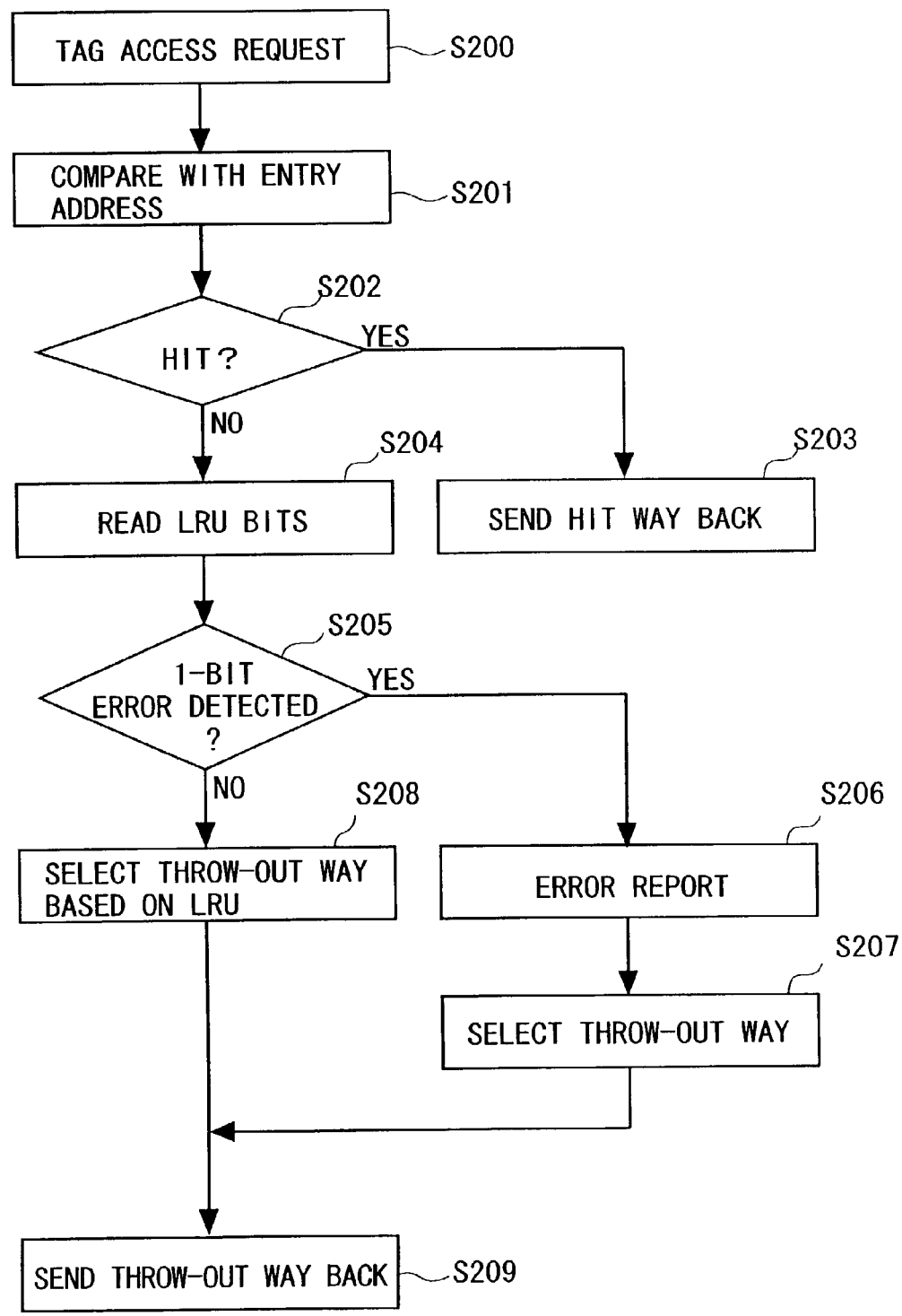
FIG. 8 is an explanatory flowchart showing an operation of a conventional cache memory device in a 4-way set associative system according to the prior art.

Next, an operation of the cache memory device 100 having the architecture described above will be explained referring to the drawings. FIG. 7 is an explanatory flowchart showing the operation of the cache memory device 100.

When given an access request to a specified address of the address space in the main memory (S100), at first, this address is separated into a match address and a line address. The ways (tag RAMs) 101a through 101d are searched according to the line addresses, and the entry address read from each way is compared with the match address (S101). If the entry address is coincident with the match address, it follows that the way concerned is hit (S102: Yes). In this case, the hit way is sent back, and there is effected an access to a copy of the main memory that retained on a data RAM of the way concerned (S103) Whereas if the match address hits none of the entry addresses of the ways (S102: No), information of a certain way is written back (or invalidated) and thrown away from the entry of the tag RAM, and the copy of the main memory having an address corresponding to the access request is read into a cache. A reference history is read for selecting this throw-out way (replace target way) (S104) It is herein assumed that a reference history "111111" is to be read out. The way selection module 102c selects the replace target way on the basis of the readout reference history.

The reference history "111111" is herein read out, and therefore, as obvious from FIG. 3, the OR operation circuit C02 outputs "1", and other OR operation circuits C12, C22 andC32 respectively outputs "0". This indicates that the way selection module 102c selects the way0 as the replace target way on the basis of the readout reference history "111111".

Next, it is judged whether a 1-bit error in the reference history is detected (S106). The reference history "111111" is herein read out, and hence, as obvious from FIG. 3, the NAND operation circuit C73 outputs WAY3 WIN="0", and other NAND operation circuits C70 through C72 respectively outputs "1". This indicates that the way detection module 102a detects the way3 as the strongest way among the four ways on the basis of the readout reference history "111111". The error detection module 102b, if the way detection module 102a is unable to detect the strongest way, detects a bit error in the reference history. Herein, the way detection module 102a detects the strongest way (way3), and therefore the error detection module 102b does not detect the bit error in the reference history (S106: No). In this case, the throw-out way is sent back without doing an error report (S107). For example, the data RAM is notified of the replace target way.

The reference history is updated so as to indicate that the way referred to (or updated) latest is the strongest way among the four ways. As far as the reference history is updated on this rule, the way detection module 103a normally detects the strongest way among the four ways, and hence the error detection module 103b does not detect the bit error in the reference history (S106: No) While on the other hand, it is assumed that the reference history "111011" is read out in S104 This reference history "111011" does not occur so far as the history is updated on the above rule. The way selection module 103c selects the replace target way on the basis of the readout reference history.

The reference history "111011" is herein read out, and therefore, as obvious from FIG. 3, the OR operation circuit C02 outputs "1", and other OR operation circuits C12, C22 and C32 respectively outputs "0". This indicates that the way selection module 102c selects the way0 as the replace target way on the basis of the readout reference history "111011".

Next, it is judged whether the 1-bit error in the reference history is detected (S106). The reference history "111011" is herein readout, and hence, as apparent from FIG. 3, the NAND operation circuits C70 through C73 respectively output "1". There is no output of "0". This indicates that the way detection module 103a does not detect the strongest way on the basis of the readout reference history "111011". The error detection module 103b, if the way detection module 103a is unable to detect the strongest way, detects the bit error in the reference history. Herein, the way detection module 103a does not detect the strongest way, and therefore the error detection module 103b detects the bit error in the reference history (S106: Yes). In this case, en error report is given to a specified application etc (S108), and the throw-out way is sent back (S107). For example, the data RAM is notified of the replace target way.

As discussed above, according to this embodiment, in the cache memory device 100 in the N-way set associative system, the bit error in the reference history can be detected from the output of the error detection module 103b without adding the redundant bits to the reference history.

The present invention can be embodied in a variety of forms without departing from the spirit or the principal features of the present invention. Therefore, the embodiment is no more than a mere exemplification in every point and is not construed in a limited manner. As discussed above, according to the present invention, in the cache memory device in the N-way set associative system, the bit error in the reference history can be detected without adding the redundant bits to the reference history.

What is claimed is:

1. A cache memory device in an N-way (N is an integer of 2 or larger) set associative system, comprising:
   a way detection unit detecting one way exhibiting a specified strength on the basis of a reference history defined as bits representing a win/loss relation between ways and updated so as to indicate one way exhibiting the specified strength;
   an error detection unit detecting a bit error in the reference history if said way detection unit does not detect one way exhibiting the specified strength and outputting the bit error outside of the cache memory device; and
   a way selection unit selecting a replace target way on the basis of less than an entirety of win/loss relations between ways of the reference history without referring to the bit error detected by the error detection unit.

2. A cache memory device in an N-way set associative system according to claim 1, wherein the reference history is updated so as to indicate a way referred to or updated latest as one way exhibiting the specified strength.

3. A cache memory device in an N-way set associative system according to claim 1, wherein the way exhibiting the specified strength is the strongest way among N-pieces of ways.

4. A cache memory device in an N-way set associative system according to claim 3, wherein said way selection unit selects the weakest way as a replace target way among N-pieces of ways.

5. A cache memory device in an N-way set associative system according to claim 4, wherein said error detection unit detects a bit error in the reference history after said way selection unit has selected the replace target way.

6. A cache memory device in an N-way set associative system according to claim 1, wherein said way selection unit, if an access request to a specified address bits none of the ways, selects a replace target way.

7. A cache memory device in an N-way set associative system according to claim 1, further comprising an error report unit reporting an error if said error detection unit detects a bit error in the reference history.

8. A reference history bit error detection method in a cache memory device in an N-way (N is an integer of 2 or larger) set associative system, comprising:
   detecting one way exhibiting a specified strength on the basis of a reference history defined as bits representing a win/loss relation between ways and updated so as to indicate one way exhibiting the specified strength;
   detecting a bit error in the reference history if one way exhibiting the specified strength is not detected and outputting the bit error outside of the cache memory device; and
   selecting a replace target way on the basis of less than an entirety of win/loss relations between ways of the reference history without referring to the bit error detected in the reference history.

9. A reference history bit error detection method according to claim 8, wherein the reference history is updated so as to indicate a way referred to or updated latest as one way exhibiting the specified strength.

10. A method of cache memory management, comprising:
    detecting a bit error in a reference history defined as bits representing a win/loss relation between ways and updated so as to indicate one way exhibiting a specified strength outputting the bit error outside of the cache memory device; and
    selecting a replace target way on the basis of less than an entirety of win/loss relations between ways of the reference history without referring to the bit error.

11. A cache memory device in an N-way (N is an integer of 2 or larger) set associative system, comprising:
    a way detection unit detecting one way exhibiting a specified strength on the basis of a reference history defined as bits representing a win/loss relation between ways and updated so as to indicate one way exhibiting the specified strength;
    an error detection unit detecting a bit error in the reference history if said way detection unit does not detect one way exhibiting the specified strength and outputting the bit error outside of the cache memory device; and
    a way selection unit selecting a replace target way by using less bits than entire bits indicating the win/loss relations between ways in the reference history without referring to the bit error detected by the error detection unit.

* * * * *

UNITED STATES PATENT AND TRADEMARK OFFICE
CERTIFICATE OF CORRECTION

| | | |
|---|---|---|
| PATENT NO. | : 7,376,868 B2 | Page 1 of 1 |
| APPLICATION NO. | : 10/347369 | |
| DATED | : May 20, 2008 | |
| INVENTOR(S) | : Shuichi Yoshizawa et al. | |

It is certified that error appears in the above-identified patent and that said Letters Patent is hereby corrected as shown below:

Column 8, Line 46, after "strength" insert --and--.

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,376,868 B2 |
| APPLICATION NO. | : 10/347369 |
| DATED | : May 20, 2008 |
| INVENTOR(S) | : Shuichi Yoshizawa et al. |

It is certified that error appears in the above-identified patent and that said Letters Patent is hereby corrected as shown below:

Column 8, Line 17, Claim 6 change "bits" to --hits--.

Signed and Sealed this

Sixth Day of January, 2009

JON W. DUDAS
*Director of the United States Patent and Trademark Office*